United States Patent [19]

Young

[11] Patent Number: 5,933,844
[45] Date of Patent: Aug. 3, 1999

[54] WRITE THROUGH VIRTUAL CACHE MEMORY, ALIAS ADDRESSING, AND CACHE FLUSHES

[75] Inventor: Mark Young, Mountain View, Calif.

[73] Assignee: Sun Microsystems, Inc., Mountain View, Calif.

[21] Appl. No.: 08/232,600

[22] Filed: Apr. 25, 1994

Related U.S. Application Data

[63] Continuation of application No. 07/787,547, Nov. 4, 1991, abandoned.

[51] Int. Cl.⁶ .................................................... G06F 12/08
[52] U.S. Cl. ........................ 711/3; 711/135; 711/138; 711/139; 711/142; 711/144; 711/203; 711/210
[58] Field of Search ................... 395/400, 425; 711/138, 139, 3, 210, 135, 203, 144, 142

[56] References Cited

U.S. PATENT DOCUMENTS

| | | | |
|---|---|---|---|
| 4,439,829 | 3/1984 | Tsiang ..................................... | 711/118 |
| 4,884,197 | 11/1989 | Sachs et al. ............................. | 711/123 |
| 5,058,006 | 10/1991 | Durdan et al. .......................... | 711/122 |
| 5,119,290 | 6/1992 | Van Loo et al. ........................ | 711/210 |
| 5,355,467 | 10/1994 | MacWilliams et al. ................ | 711/146 |

FOREIGN PATENT DOCUMENTS 0 322 888  12/1988  European Pat. Off. .

OTHER PUBLICATIONS

MC68851 Paged Memory Management Unit User's Manual; Motorola; Prentice Hall, Inc., 1986; pp. 5–21.

Craig R. Frink and Paul J. Roy, "A Virtual Cache–Based Workstation Architecture", (pp. 80–87), *2nd IEEE Conference on Computer Workstations* (Mar. 7–10, 1988), The Compuer Society Press, Washington, D.C. *p. 82, right col., line 4–p. 83, right col., line 17*.

*Primary Examiner*—Reginald G. Bragdon
*Attorney, Agent, or Firm*—Blakely Sokoloff Taylor & Zafman

[57] ABSTRACT

In a computer system comprising a CPU, a cache memory and a main memory wherein the cache memory is virtually addressed, and some of the virtual addresses are alias address to each other, a cache memory controller comprising a cache control logic, a cache tag array, a memory management unit, and an alias detection logic is provided. The cache control logic skips flushing of a cache line if the cache line is corresponding to a memory block in a non-cacheable physical memory page, thereby avoiding unnecessary flushes and allowing the CPU to update the cache memory and the main memory using an improved write through and no write allocate approach that reduces cache flushes.

9 Claims, 3 Drawing Sheets

WRITE THROUGH VIRTUAL CACHE MEMORY, ALIAS ADDRESSING, AND CACHE FLUSHES

This is a continuation of application Ser. No. 07/787,547, filed Nov. 04, 1991, abandoned.

BACKGROUND OF THE INVENTION

1. Field of the Invention

The present invention relates to the field of cache memory system. More particularly, the present invention relates to reducing cache flushes in a virtual cache memory system that supports alias addressing for programs with common memory and employs write through with no write allocate for updating the cache and main memory.

2. Background

In a cache memory system that employs write through with no write allocate for updating the cache and main memory, data are dispatched to a cache line of the cache memory and the corresponding memory block of the main memory at the same time. However, the data are written into the cache line only if there is a write cache hit. The alternative is the write through with write allocate approach which loads the memory block into the cache line, and then updates the cache line as if it was a write cache hit.

Additionally, the writing of the data into the corresponding memory block typically takes a lot longer than the writing of the data into the cache line of the cache memory. While waiting for the writing of the data into main memory to complete, the central processing unit (CPU) is stalled. One approach to reduce write stalls is to employ a write buffer for writing into the main memory, thereby allowing the CPU to continue after the data is written into the cache memory.

In a virtual cache memory system, cache hit/miss is decided based on the virtual address (plus other information) instead of the physical address. Typically, to access the main memory, the virtual address is translated into the physical address by a memory management unit. For a cache memory system having a size greater than one physical page, two or more virtual addresses may be translated into the same physical address. In other words, data from the same physical address may be cached in two or more distinct lines.

This characteristic of having a physical address mapped into two or more virtual addresses, except the fact that the content of the physical address is cached into two or more cache lines, is actually desirable to executing programs who want to share a common memory. Each program sharing the common memory will have their own virtual addresses for the common memory, commonly referred to as alias addressing. However, the fact that the content of the physical address is cached into two or more cache lines presents a data consistency problem, since the content in the cache lines can get out of sync when the content of one of the cache lines is updated in a write cache hit. One approach to the data consistency problem of alias addressing is to employ a technique that forces the virtual addresses to be cached into the same cache location. For those virtual addresses that cannot be forced into the same cache location, their physical memory page is marked as "Do Not Cache", thereby avoiding the data consistency problem all together.

In a virtual cache memory system that employs write through with no write allocate for updating the cache and main memory, the data consistency problem of alias addressing is still not fully addressed, since data can be written around the common cache location into the physical location directly on a write cache miss. To ensure data consistency, the cache line is flushed on a write cache miss, that is the content of the cache line is invalidated on a write cache miss. Typically, the cache line is unconditionally flushed, even though flushing of the cache line is unnecessary for a virtual address that map to a physical address of a "Do Not Cache" physical memory page, and most programs do not share common memory. Flushing the line is the preferred method because it is very difficult for hardware to determine which virtual addresses from the CPU are aliased. Hence, a general rule is to assume they all are and flush unconditionally.

Flushing a cache line is costly, since the content of the cache line that was invalidated would have to be refetched from the main memory later. Unconditional flushing is particularly wasteful since flushing is unnecessary for those virtual addresses that map to "Do Not Cache" physical addresses, and yet these unnecessary flushings will always be performed since these virtual addresses always result in write cache misses. In a typical computer system that supports alias addressing for programs with common memory, there are lots of physical addresses that are marked "Do Not Cache". For example, the memory allocated for the frame buffers of such a computer system having a pix-mapped video display and/or display adapters are typically marked "Do Not Cache". Every screen scroll performed by the processor will cause unnecessary flushings to be performed, since every write to a frame buffer will cause a write cache miss.

Experience has shown that excessive flushing can dramatically hurt the performance of such computer systems, particularly if the virtual cache memory system is directly mapped or mapped with a low set associativity. Therefore, it is desirable if flushing of a cache line can be performed conditionally when a cache write miss occurs on a virtual cache memory system that supports alias addressing for programs with common memory and employs write through with no write allocate for updating the cache and main memory.

For further descriptions of virtual cache memory system and write through with no write allocate, see J. L. Hennessy, D. A. Patterson, *Computer Architecture, A Quantitative Approach,* Morgan Kaufmann Publishers Inc., 1990, pages 408–449. For further descriptions of alias addressing, see U.S. patent application Ser. No. 07/104,635, filed on Oct. 10, 1987, abandoned, and its Continuation application Ser. No. 07/554,186, filed on Jul. 16, 1990 and issued as a U.S. Pat. No. 5,119,290.

SUMMARY OF THE INVENTION

It is therefore the object of the present invention to improve the performance of a virtual cache memory system that supports alias addressing for programs with common memory, and employs write through with no write allocate for updating the cache and main memory.

It is the object of the present invention to reduce cache flushings in a virtual cache memory system that supports alias addressing for programs with common memory, and employs write through with no write allocate for updating the cache and main memory.

Under the present invention, these and other objects are achieved by providing an improved cache controller that supports virtual addressing for the cache memory, write through with no write allocate for update, alias addressing for programs with common memory, and skipping cache line flushing when a write cache miss occurs in a physical memory page that is not cached. Under the preferred embodiment, the physical memory page is marked "Do Not Cache" in the memory management unit of the cache controller. When the cache control logic detects a write cache miss, it checks with the memory management unit to determine if the write cache miss occurs in a physical memory page that is marked "Do Not Cache". If the physical memory page is so marked, the cache control logic skips flushing the cache line, thereby reducing unnecessary flushing and improving the performance of the cache memory system.

BRIEF DESCRIPTION OF THE DRAWINGS

The objects, features, and advantages of the present invention will be apparent from the following detailed description of the preferred embodiment of the invention with references to the drawings in which.

DETAILED DESCRIPTION OF THE PREFERRED EMBODIMENT

An improved virtual cache memory system with reduced cache flushes that supports alias addressing for programs with common memory and employs write through with no write allocate for updating the cache and main memory is disclosed. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
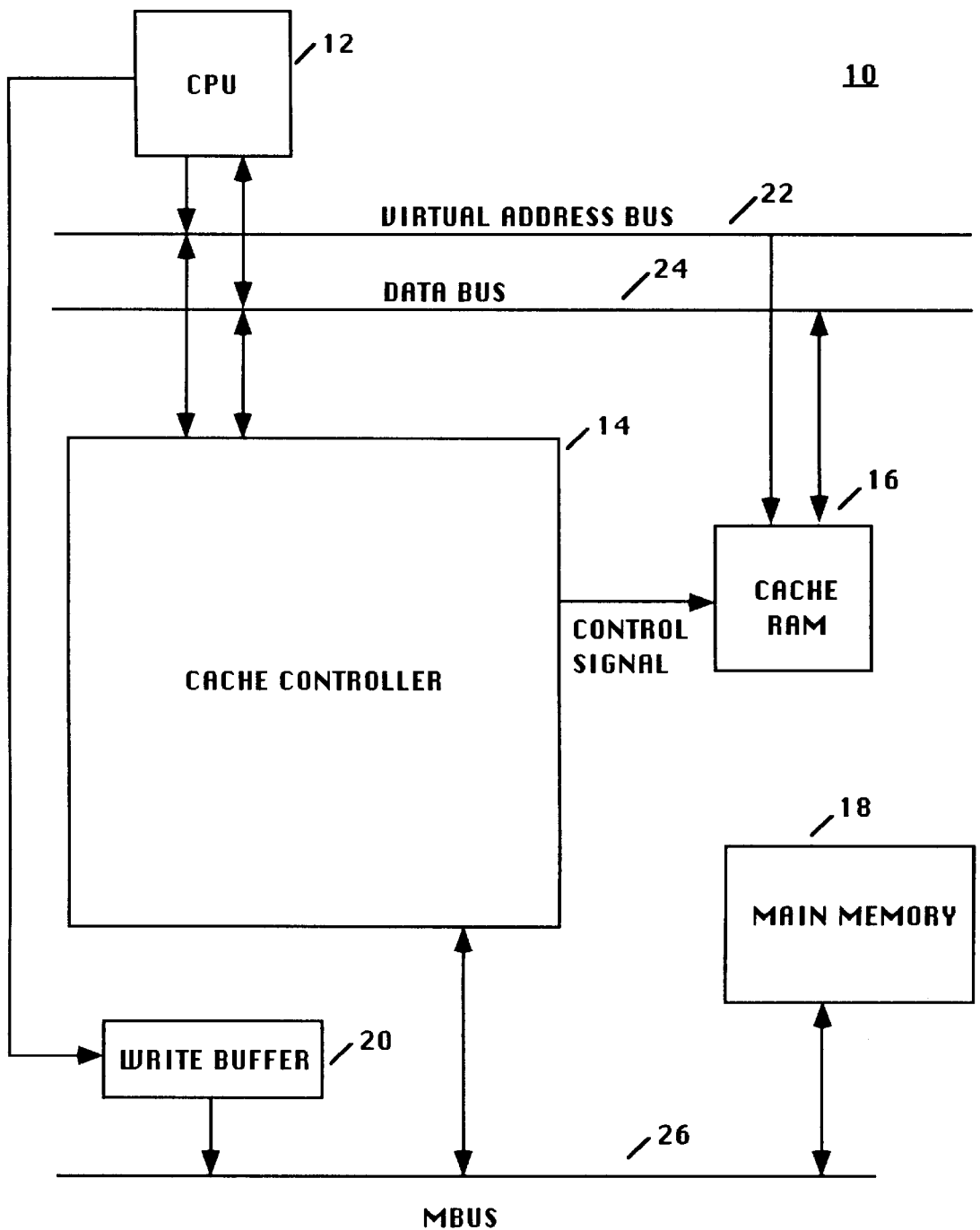
FIG. 1 illustrates a computer system which embodies the teachings of the present invention.

Referring now to FIG. 1, a block diagram illustrating a computer system which embodies the teachings of the present invention is shown. As shown in FIG. 1, the computer system 10 comprises a central processing unit (CPU) 12, a cache memory controller 14 of the present invention, a cache memory 16 and a main memory 18. The CPU 12 is coupled to the cache memory controller 14 of the present invention and a cache memory 16 through a virtual address bus 22 and a data bus 24. Additionally, the CPU 12 is coupled to the main memory 16 via a write buffer 20 and a multiplexed data and address bus 26, and the cache memory controller 14 of the present invention is coupled to the main memory 16 via the multiplexed data and address bus 26.

The cache memory 16 is virtually addressed, that is cache hit/miss is decided based on the virtual address instead of the physical address. The main memory 18 may be mapped into the cache memory 16 directly, or in a fully associative manner, or in a set associative manner. However, alias virtual addresses corresponding to the same physical address are either indexed to the same area of cache, or not mapped to the cache memory.

The CPU 12 updates the cache memory 16 and the main memory 18 using a write through with no write allocate approach, that is data are dispatched from the CPU 12 to the cache memory 16 and the main memory 18 simultaneously, and the dispatched data are cached into the cache lines of the cache memory 16 if there is a write cache hit. In other words, the memory block is not fetched into the cache line from the main memory and then updated as if it was a write cache hit when a write cache miss occurs.

The CPU 12, the cache memory 16, the main memory 18, the write buffer 20, the virtual address bus 22, the data bus 24 and the multiplexed data and address bus 26 are intended to be representative of a wide range of well known CPU, cache memory, main memory, write buffer, virtual address bus, data bus and multiplexed data and address bus found in most computer systems with virtual cache memory using the write through with no write allocate approach to update the cache and main memory. An example of such computer systems is the Sparcstation™ computer system manufactured by Sun Microsystems, Inc., of Mountain View, Calif. (Sparcstation is a registered trademark of Sun Microsystems, Inc.)

Furthermore, it will be appreciated that the CPU 12, the cache memory controller 14 of the present invention, the cache memory 16 and the main memory 18 may be coupled to each other in a variety of other well known manners beside the manner used in the embodiment illustrated by FIG. 1.

Figure 2:
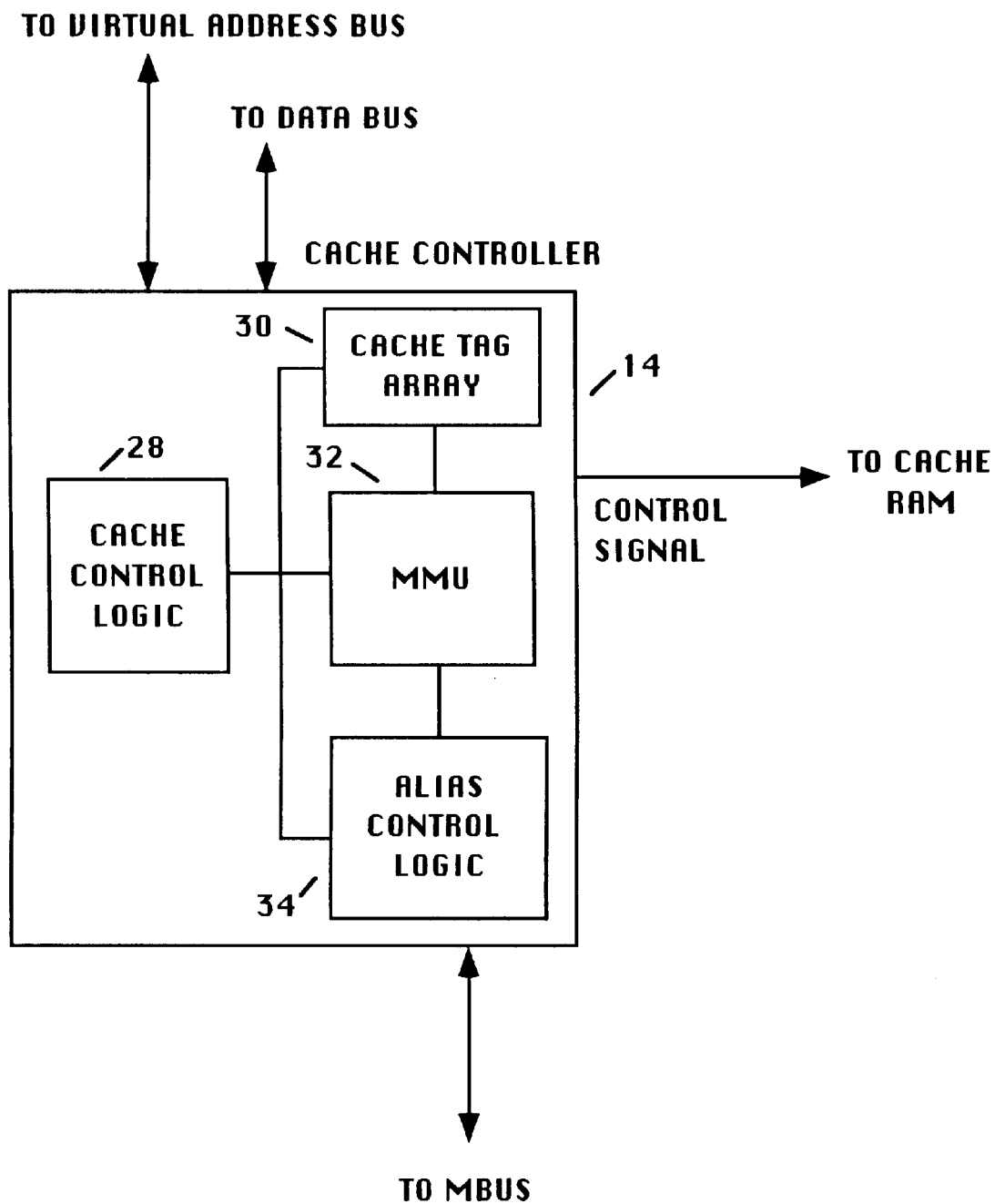
FIG. 2 illustrates the cache memory controller of the present invention.

Referring now to FIG. 2, a block diagram illustrating the cache memory controller of the present invention in its presently preferred form is shown. The cache controller 14 of the present invention, in its presently preferred form, comprises a cache control logic 28, a cache tag array 30, a memory management unit 32 and an alias control logic 34. The cache control logic 28 is coupled to the cache tag array 30, the memory management unit 32 and the alias control logic 34.

The cache tag array 30 comprises a plurality of cache tags corresponding to the cache lines of the cache memory 16. Each cache tag comprises a truncated virtual address identifying the memory blocks of the main memory 18 currently cached in the cache lines of the cache memory 16, and a valid bit indicating whether the data currently cached in the cache line are valid or not. The cache tag array 30 may be implemented in any of the well known manners in the art.

The memory management unit 32 comprises circuitry for mapping a virtual address to a physical address. Additionally, the memory management unit 32 comprises a physical memory page table having a plurality of physical memory page descriptor blocks describing the physical memory pages of the main memory 18. In particular, each physical memory page descriptor block comprises a "Do Not Cache" bit which is set when the physical memory page is non-cacheable due to alias addressing being supported on the computer system. The memory management unit 32 may be implemented in a variety of well known manners, for further descriptions of an implementation of the memory management unit 32, see U.S. patent application Ser. No. 07/104,635, filed on Oct. 2, 1987, and its Continuation application Ser. No. 07/554,186, filed on Jul. 16, 1990 and issued as a U.S. Pat. No. 5,119,290.

The alias control logic 34 comprises circuitry for detecting alias addresses when the CPU 12 attempts to read from the cache memory 16. The alias control logic 34 may be implemented in a variety of well known manners, for further descriptions of an implementation of the alias control logic, see the reference provided for the memory management unit.

The cache control logic 28 comprises circuitry for controlling the operation of the cache memory controller 14. For the basic functions offered by the cache controller 14 similar to those basic functions offered by cache controller found in most computer systems with virtual cache memory using the write through with no write allocate approach for update, the cache control logic 28 may be implemented in any of the well known manners found in these computer systems. For updating the cache memory 16, the control flow of the cache control logic is illustrated in FIG. 3.

Figure 3:
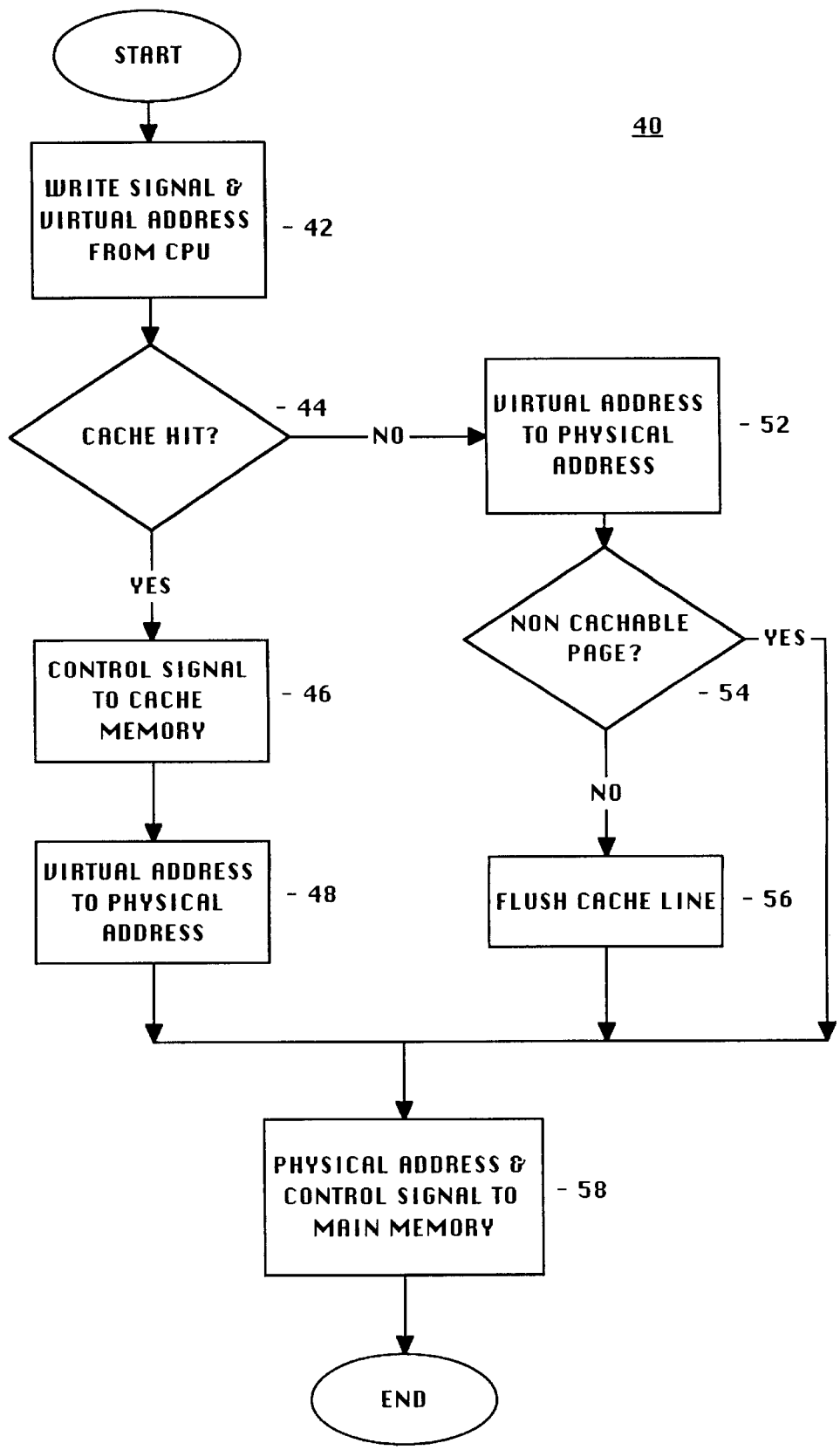
FIG. 3 illustrates the control flow of the cache control logic of the cache memory controller of the present invention.

As shown in FIG. 3, the cache control logic receives a write signal and a virtual address from the CPU, block 42. The cache control logic determines if the virtual address results in a write cache hit using the cache memory tags, block 44. If the virtual address results in a write cache hit, the cache control logic provides a control signal to the cache memory instructing the cache memory to receive a data byte from the CPU, and stores the data byte into the cache line identified by the virtual address, block 46. The data byte is dispatched from the CPU to the cache memory after the dispatching of the write signal and initial address from the CPU to the cache memory controller.

Additionally, the cache control logic maps the virtual address to a physical address using the memory management unit, block 48. The cache control logic then provides the physical address and a control signal to the main memory instructing the main memory to receive a data byte from the CPU and stores the data byte into the memory location identified by the physical address, block 58. The data byte is dispatched from the CPU to the main memory simultaneous with the dispatching of the data byte from the CPU to the cache memory.

If the virtual address results in a write cache miss, the cache control logic maps the initial address to a physical address using the memory management unit, block 52, the cache control logic then determines if the corresponding physical address identifies a memory location in a physical memory page that is marked non-cacheable using the memory management unit, block 54. If the corresponding physical address identifies a memory location in a physical memory page that is not marked non-cacheable, the cache control logic flushes the cache line, block 56, otherwise, the cache control logic skips flushing the cache line, thereby avoiding the unnecessary flushings for memory locations that are not cached. The cache control logic flushes the cache line by unsetting the valid bit in the cache tag for the cache line, thereby invalidating the data content currently cached in the cache line. Since a write operation resulting in a write cache miss must be checked for normal access permission prior to letting the CPU continue operating, thus the checking with the management memory unit, and therefore the avoidance of the unnecessary flushes, can be achieved without performance penalty.

Additionally, regardless whether the cache line is flushed, the cache control logic provides the physical address and a control signal to the main memory instructing the main memory to receive a data byte from the CPU and stores the data byte into the memory location identified by the physical address, block 58. As described earlier, the data byte is dispatched from the CPU to the main memory simultaneous with the dispatching of the data byte from the CPU to the cache memory.

While the present invention has been described in terms of a presently preferred embodiment, those skilled in the art will recognize that the invention is not limited to the embodiment described. The method and apparatus of the present invention can be practiced with modification and alteration within the spirit and scope of the appended claims. The description is thus to be regarded as illustrative instead of restrictive on the present invention.

What is claimed is:

1. In a computer system comprising a central processing unit (CPU) coupled to a cache memory and a main memory executing a plurality of processes, wherein cache hits/misses are based on virtual addresses and some of said virtual addresses are alias addresses to each other, a method for said CPU to update said cache and main memory that reduces cache flushings, said method comprising the steps of:

receiving by said cache memory a write signal and a virtual address from said CPU;

determining by said cache memory if said virtual address results in a selected one of a write cache hit and a write cache miss based on said virtual address and mapping by said cache memory said virtual address to a physical address that identifies a memory location of a memory block of said main memory;

providing by said cache memory a first control signal to an internal cache memory data array instructing said internal cache memory data array to accept a data byte from said CPU if said virtual address results in said write cache hit, said data byte being dispatched by said CPU to said cache memory, said data byte being cached in a cache line of said cache memory upon acceptance by said cache memory, said cache line being identified by said virtual address and corresponding to said memory block;

providing by said cache memory said physical address and a second control signal to said main memory, said second control signal instructing said main memory to accept said data byte from said CPU and storing said data byte in said memory location, said data byte being also dispatched by said CPU to said main memory;

determining by said cache memory if said main memory location identified by said physical address is a non-cacheable memory location of a non-cacheable memory block of said main memory; and waiting by said cache memory for the result of said non-cacheability determination, the result of said non-cacheability determination being available after the result of said cache hit/miss determination, then without detecting for alias addresses of said virtual address, conditionally flushing by said cache memory a cache line in which said memory block could have been cached if said virtual address results in said write cache miss and said memory location is not a non-cacheable memory location.

2. The method as set forth in claim 1, wherein, said step of determining by said cache memory if said main memory location is a non-cacheable memory location of a non-cacheable memory block comprises checking by said cache memory if a "Do Not Cache" bit of a physical memory page descriptor in a physical memory page table of said cache memory for a physical memory page is set, said physical memory page comprising said memory block, said "Do Not Cache" bit being set by said cache memory if said physical memory page including said memory block is non-cacheable.

3. The method as set forth in claim 1, wherein, said step of flushing said cache line by said cache memory comprises unsetting by said cache memory a valid bit in a cache tag of said cache memory for said cache line, thereby invalidating data currently cached in said cache line, said valid bit being set by said cache memory if data currently cached in said cache line are valid.

4. In a computer system comprising a central processing unit (CPU) coupled to a cache memory and a main memory executing a plurality of processes, wherein cache hits/misses are based on virtual addresses and some of said virtual addresses are alias addresses to each other, a cache memory controller for said CPU to update said cache and main memory that reduces cache flushings, said cache memory controller comprising:

a cache tag array for storing a plurality of cache tags identifying a plurality of memory blocks of said main memory currently cached in a plurality of cache lines of said cache memory corresponding to said cache tags;

a memory management unit for mapping virtual addresses to physical addresses that identify memory locations of memory blocks of said main memory, and tracking non-cacheable physical memory pages of said main memory, said non-cacheable physical memory pages comprising non-cacheable memory blocks; and a cache control logic coupled to said CPU, said cache tag array, and said memory management unit for receiving a write signal and a virtual address from said CPU, determining if said virtual address results in a selected one of a write cache hit and a write cache miss based on said virtual address and using said cache tag array, mapping said virtual address to a physical address that identifies a memory location of said main memory using said memory management unit, providing a first control signal to said cache memory instructing said cache memory to accept a data byte from said CPU if said virtual address results in said write cache hit, providing said physical address and a second write control signal to said main memory instructing said main memory to accept said data byte from said CPU and storing said data byte in said memory location, determining if said main memory location identified by said physical address is a non-cacheable memory location using also said memory management unit, and waiting for the result of said non-cacheability determination, the result of said non-cacheability determination being available after the result of said cache hit/miss determination, then without detecting for alias addresses of said virtual address, conditionally flushing a cache line in which said memory block could have been cached if said virtual address results in said write cache miss and said memory location is not a non-cacheable memory location;

said data byte being dispatched by said CPU to said main memory and said cache memory simultaneously, said data byte being cached in a cache line of said cache memory upon acceptance by said cache memory, said cache line being identified by said virtual address and corresponding to said memory block.

5. The apparatus as set forth in claim 4, wherein, said memory management unit tracks non-cacheable physical memory pages of said main memory by setting a "Do Not Cache" bit in a physical memory page descriptor block in a physical memory page descriptor table for each non-cacheable physical memory page; and said cache control logic determines if said main memory location is a non-cacheable memory location by checking if said "Do Not Cache" bit of said physical memory page descriptor block for a physical memory page comprising said memory block is set.

6. The apparatus as set forth in claim 4, wherein, said cache control logic flushes said cache line by unsetting a valid bit in a cache tag for said cache line thereby invalidating data currently cached in said cache line, said valid bit being set by said cache control logic if data currently cached in said cache line are valid.

7. The computer system as set forth in claim 4 wherein said cache memory controller further comprises:

an alias control logic coupled to said cache control logic for detecting alias addresses when said CPU attempts to read from said cache memory.

8. An improved computer system comprising a central processing unit (CPU) coupled to a cache memory and a main memory executing a plurality of processes, wherein cache hits/misses are determined based on virtual addresses, some of said virtual addresses are alias addresses to each other, and cacheability of memory locations is determined as an integral part of virtual address to physical address translations, said improvement comprising an improved cache memory controller coupled to said CPU, said cache memory, and said main memory, that allows said CPU to update said cache and main memory with an improved write through with no write allocate approach that reduces cache flushes on write cache misses by waiting for the results of said cacheability determinations, the results of said cacheability determinations being available after the results of the corresponding cache hit/miss determinations, then without detecting for alias addresses of the virtual addresses, conditionally performing cache flushes for cache write misses only for cacheable memory locations.

9. The improved computer system as set forth in claim 8 wherein said cache memory controller further comprises:

an alias control logic coupled to said cache control logic for detecting alias addresses when said CPU attempts to read from said cache memory.

* * * * *